(12) United States Patent
Gu et al.

(10) Patent No.: US 9,335,231 B2
(45) Date of Patent: May 10, 2016

(54) MICRO-PIRANI VACUUM GAUGES

(71) Applicants: Lei Gu, Lexington, MA (US); Stephen F. Bart, Newton, MA (US); Ole Wenzel, Danish (DK)

(72) Inventors: Lei Gu, Lexington, MA (US); Stephen F. Bart, Newton, MA (US); Ole Wenzel, Danish (DK)

(73) Assignee: MKS Instruments, Inc., Andover, MA (US)

( * ) Notice: Subject to any disclaimer, the term of this patent is extended or adjusted under 35 U.S.C. 154(b) by 253 days.

(21) Appl. No.: 14/224,927

(22) Filed: Mar. 25, 2014

(65) Prior Publication Data

US 2015/0276536 A1    Oct. 1, 2015

(51) Int. Cl.
*G01L 21/12* (2006.01)
*G01L 21/10* (2006.01)

(52) U.S. Cl.
CPC ................ *G01L 21/12* (2013.01); *G01L 21/10* (2013.01)

(58) Field of Classification Search
None
See application file for complete search history.

(56) References Cited

U.S. PATENT DOCUMENTS

| | | | |
|---|---|---|---|
| 4,682,503 A | 7/1987 | Higashi | |
| 5,347,869 A | 9/1994 | Shie et al. | |
| 5,633,465 A * | 5/1997 | Kaufmann | G01L 21/12 427/101 |
| 7,418,869 B2 | 9/2008 | Arnold et al. | |
| 8,230,746 B2 | 7/2012 | Miyashita | |
| 2006/0086189 A1* | 4/2006 | Packer | G01L 21/12 73/708 |
| 2008/0115585 A1* | 5/2008 | Miyashita | G01L 21/12 73/755 |
| 2008/0168842 A1* | 7/2008 | Higashi | G01L 21/10 73/755 |
| 2008/0304544 A1* | 12/2008 | Kvisteroy | G01L 21/00 374/143 |
| 2009/0096460 A1* | 4/2009 | Watanabe | H01J 41/04 324/462 |
| 2009/0235752 A1* | 9/2009 | Miyashita | G01L 19/0092 73/718 |
| 2010/0154553 A1 | 6/2010 | Le et al. | |
| 2010/0327279 A1 | 12/2010 | Kimata | |
| 2011/0174079 A1* | 7/2011 | Manohara | G01L 21/12 73/708 |
| 2015/0377735 A1* | 12/2015 | Minami | G01L 21/12 73/755 |
| 2015/0377812 A1* | 12/2015 | Minami | G01N 27/14 73/725 |

FOREIGN PATENT DOCUMENTS

| | | |
|---|---|---|
| CN | 101608962 | 12/2009 |
| WO | WO2013/008203 | 1/2013 |

OTHER PUBLICATIONS

Partial International Search Report dated Jul. 2, 2015 from corresponding PCT Application No. PCT/US2015/015810.
Sari et al., "An Electromagnetic Micro Energy Harvester Based on an Array of Parylene Cantilevers," J. Micromech. Microeng., 19:1-13 (2009).
Chae et al., "A Micromachined Pirani Gauge With Dual Heat Sinks", IEEE Transaction on Advanced Packaging, 28:619-625 (2005)

* cited by examiner

*Primary Examiner* — Andre Allen
(74) *Attorney, Agent, or Firm* — McDermott Will & Emery LLP

(57) ABSTRACT

Micro-Pirani gauge vacuum gauges are described that use low-thermal conductivity support elements. A micro-Pirani gauge or vacuum sensor can include a heating element operative to heat a gas and to produce a signal corresponding to the pressure of the gas; a platform configured to receive the heating element, with the platform having a first coefficient of thermal conductivity; and a support element connected to a substrate and configured to support the platform with the heating element within an aperture disposed in the substrate, with the support element having a second coefficient of thermal conductivity, where the second coefficient of thermal conductivity is less than the first coefficient of thermal conductivity. Multimode pressure sensing including a micro-Pirani gauge are also described.

39 Claims, 8 Drawing Sheets

MICRO-PIRANI VACUUM GAUGES

BACKGROUND

Vacuum gauges are useful for a number of applications. In many industries certain processes require pressure measurements over a wide-range of pressures, such as, from about 1000 Torr to less than $10^{-9}$ Torr. Some semiconductor and electronic device manufacturing processes, for example, typically require accurate pressure measurements from ultra-high vacuum to atmospheric pressures.

One type of vacuum gauge includes a metal filament (usually platinum) suspended in a tube which is connected to the system whose vacuum is to be measured. Connection is usually made either by a ground glass joint or a flanged metal connector, sealed with a gasket or an o-ring. The filament is connected to an electrical circuit from which, after calibration, a pressure reading may be taken. Such a gauge is commonly called a "Pirani" gauge, in reference to its initial developer. The operation of a Pirani gauge is based on heat transfer from the suspended heater, through a gas, and to a heat sink. The thermal conductance through the gas is a function of the gas pressure. Thus measurement of the thermal conductance through the gas allows the calculation of its pressure. In addition to the heat transfer through the gas, there are three other heat transfer mechanisms: (1) conduction through the mechanical supports, (2) convection by the gas, and (3) radiation.

FIG. 1, includes views (A)-(C), and illustrates an example of a prior art micro-Pirani sensor 100. The heart of this sensor 100 is the meandering electric filament heater 102 shown at the center of the structure in FIG. 1A. This filament 102 is imbedded in a thin insulating diaphragm 104 (e.g., SiN) with an open cavity below (not shown). This thin diaphragm 104 is both electrically and thermally insulating. The diaphragm 104 is connected to a substrate 106. View 1(B) shows the addition of a layer of bonding material 108, which can receive a cap 112 of heat-sink material.

With continued reference to FIG. 1, the electrical insulation can be used to eliminate leakage currents from the heater 102. The thermal insulation reduces the parasitic heat loss that occurs due to conduction in the plane of the diaphragm 104. Drawbacks of this SiN insulating diaphragm are (i) that it transfers considerable heat to the substrate at vacuum, (ii) it limits the thermal transfer through the gaseous molecular exchange, and (iii) it exhibits non-uniform temperature distribution at the filament area.

SUMMARY

The subject technology according to the present disclose can provide various advantages by making use of a supporting structure or structures that have low thermal conductivity in relation to other structures and components of a micro-Pirani gauge.

An example of a micro-Pirani vacuum gauge or sensor, according to the present disclosure, can include: a heating element operative to heat a gas and to produce a signal corresponding to the pressure of the gas; a platform configured to receive the heating element, with the platform having a first coefficient of thermal conductivity; and a support element connected to a substrate and configured to support the platform with the heating element within an aperture disposed in the substrate, with the support element having a second coefficient of thermal conductivity, where the second coefficient of thermal conductivity is less than the first coefficient of thermal conductivity.

A micro-Pirani sensor can include or have any of the following features, in any order or combination:

The first coefficient of thermal conductivity may be greater than or equal to a coefficient of thermal conductivity of the heating element. The second coefficient of thermal conductivity may be at least one order of magnitude less than the first coefficient of thermal conductivity. The second coefficient of thermal conductivity may be at least two orders of magnitude less than the first coefficient of thermal conductivity. The second coefficient of thermal conductivity may be less than or equal to 0.2 W/mK. The support element can include, in exemplary embodiments, parylene, polyamide, polyimide, polytetrafluoroethylene (PTFE), silicon oxide, and/or silicon nitride; though other materials are of course within the scope of the present disclosure. The support element can include or be formed as a continuous diaphragm. The support element can be perforated or patterned. The heating element can include nickel, titanium, or platinum. The heating element can include a material having a temperature coefficient of resistance greater than or equal to 0.003/° C. The platform can include aluminum nitride, silicon nitride, sapphire, diamond, or aluminum oxide. The heating element may be disposed within the platform and not directly exposed to the gas. The platform may be disposed within the support element and not directly exposed to the gas. The micro-Pirani sensor can include a cap connected to the substrate and covering the support element, wherein the cap is configured to form a volume with a gap between a wall of the cap and the support element supporting the platform, wherein gap is a desired size, and wherein the gap provides a mean free path of a desired size for gas molecules within the volume. The micro-Pirani vacuum sensor can have a dynamic range of pressure measurement that includes 1×10E-6 Torr.

Such gauges may be included within or be a part of other devices, e.g., multi-mode pressure gauges having other types of pressure sensors.

In one example, a combined pressure gauge or dual-mode vacuum sensor in accordance with the present disclosure may include: (A) a first vacuum sensor with a first dynamic range of pressure measurement, the first vacuum sensor comprising a micro-Pirani vacuum sensor having, (i) a heating element operative to heat a gas and to produce a signal corresponding to the pressure of the gas; (ii) a platform configured to receive the heating element, wherein the platform has a first coefficient of thermal conductivity; and (iii) a support element connected to a substrate and configured to support the platform with the heating element within an aperture disposed in the substrate, wherein the support element has a second coefficient of thermal conductivity, and wherein the second coefficient of thermal conductivity is less than the first coefficient of thermal conductivity. The combined pressure gauge or dual-mode vacuum sensor may also include (B) a second vacuum sensor having a second dynamic range of pressure measurement.

A multi-mode pressure gauge can include or have any of the following features, in any order or combination:

The first coefficient of thermal conductivity can be greater than or equal to the a coefficient of thermal conductivity of the heating element. The second coefficient of thermal conductivity can be at least one order of magnitude less than the first coefficient of thermal conductivity. The first coefficient of thermal conductivity can be equal to a coefficient of thermal conductivity of the heating element. The second coefficient of thermal conductivity can be less than or equal to 0.2 W/mK. The support element can include parylene, polyamide, polyimide, or polytetrafluoroethylene (PTFE). The support element can include a continuous diaphragm. The support element can be perforated or patterned. The heating element can include nickel, titanium, or platinum. The heating element can include a material having a temperature coefficient of resistance greater than or equal to 0.003/° C. The platform can include aluminum nitride, silicon nitride, sapphire, diamond, or aluminum oxide. The heating element may be disposed within the platform and not directly exposed to the gas. The platform can be disposed within the support element and not directly exposed to the gas. The dual-mode vacuum sensor can include a cap connected to the substrate and covering the support element, wherein the cap is configured to form a volume with a gap between a wall of the cap and the support element supporting the platform, wherein gap is a desired size, and wherein the gap provides a mean free path of a desired size for gas molecules within the volume. The micro-Pirani vacuum sensor may have a dynamic range of pressure measurement that includes 1×10E-6 Torr. A second sensor can include a micro-Pirani vacuum sensor. The second sensor can include a capacitance manometer. The second sensor may include a piezoresistive manometer. The second sensor may include a resonator pressure sensor. Additional sensors may also be included.

An exemplary method of manufacturing a micro-Pirani vacuum sensor may include: depositing a first layer of platform material on a first side of a substrate; depositing heating element material on the first layer of platform material; depositing a second layer of platform material on the heating element material and the first layer of platform material together; forming a platform supporting the heating element material; depositing a first layer of support element material over at least a portion of the substrate and at least a portion of the platform, wherein the support element material has a lower coefficient of thermal conductivity than that of the platform material; removing substrate material adjacent to the platform, wherein an aperture is made in the substrate, and exposing a portion of the platform and the first layer of support element material; and depositing a second layer of material on the second side of the substrate and on the exposed portion of the platform and first layer of support element material.

A method of manufacturing a micro-Pirani vacuum sensor can include or have any of the following features or steps, in any order or combination:

The method can include providing a substrate having a passivation or insulating layer on first and second sides. The passivation layer can include silicon oxide or silicon nitride. The method can include depositing a first layer of support element material over the entire extent (or a just a portion) of a surface of the platform. The support element material can include, e.g., parylene, polyamide, polyimide, or polytetrafluoroethylene (PTFE). The method can include removing substrate material adjacent to the platform comprises backside etching. The method can include depositing a first layer of support element material comprises patterning an exposed area of the platform. The platform material may have a coefficient of thermal conductivity higher than that of the heating element material.

These, as well as other components, steps, features, benefits, and advantages of the present disclosure, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1A:
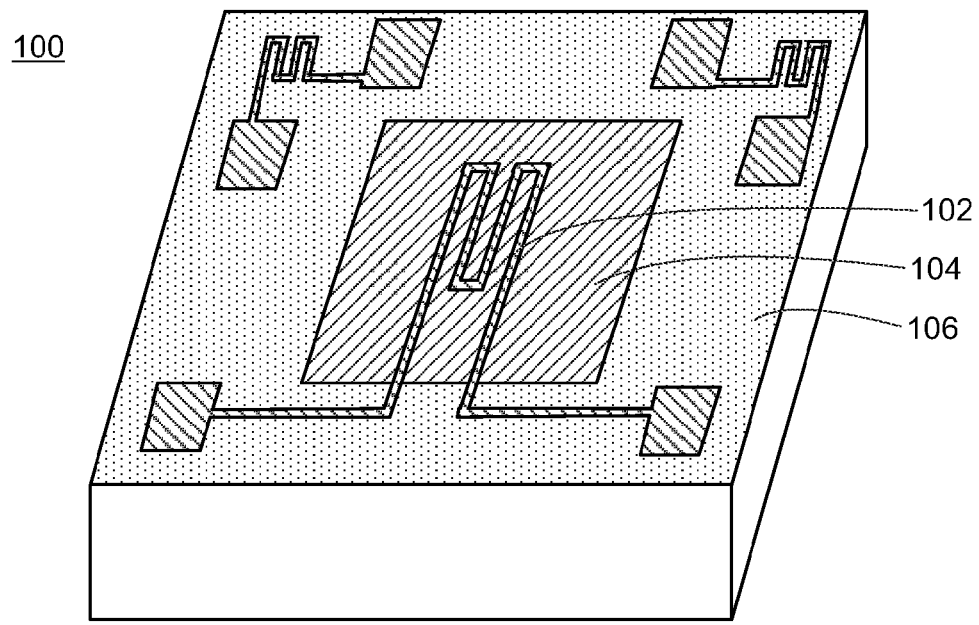
FIG. 1 includes views (A)-(C) illustrating an example of a prior art Pirani gauge.
Figure 1B:
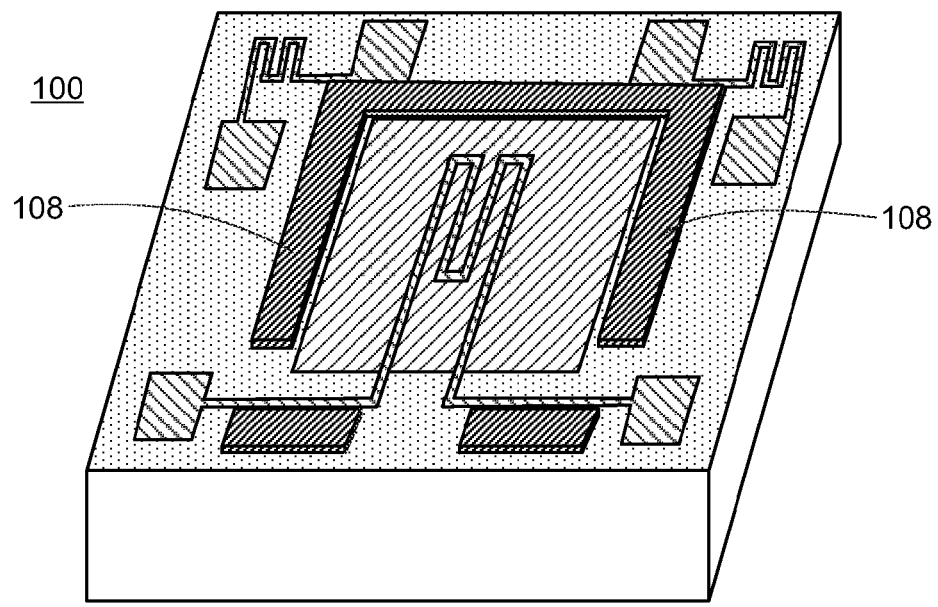
Figure 1C:
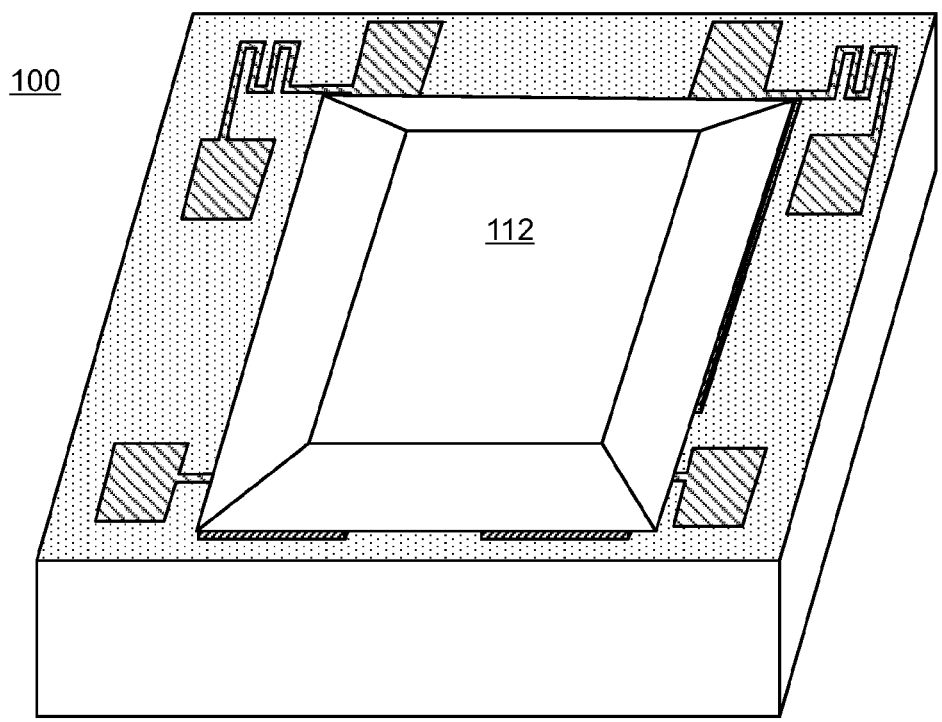

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF ILLUSTRATIVE EMBODIMENTS

Illustrative embodiments of the subject technology are now described. Other embodiments may be used or practiced in addition or instead. Details that may be apparent or unnecessary may be omitted to save space or for a more effective presentation. Conversely, some embodiments may be practiced without all of the details that are disclosed.

As was noted previously, the operation of a Pirani gauge is based on heat transfer from a suspended heater to a heat sink through a gas. The thermal conductance through the gas is a function of its pressure. Thus measurement of the thermal conductance through the gas allows the calculation of its pressure. In addition to the heat transfer through the gas, there are three other heat transfer mechanisms: (1) conduction through the mechanical supports, (2) convection by the gas, and (3) radiation. Among these, the radiation can be considered as negligible for micro-scaled sensors, and the convection can be considered as negligible under 10 Torr pressure.

Embodiments of micro-Pirani gauges according to the present disclosure can (i) suppress/reduce or minimize the heat transfer through the solid support, and/or (ii) increase/maximize the heat transfer through the gas. In exemplary embodiments, a support element made of a low thermal conductivity material, such as parylene, and a high-thermal conductivity material, such as aluminum-nitride, can be used as a platform to receive or encapsulate the heating filament to provide the noted advantages; other suitable materials may of course be used within the scope of the present disclosure. Embodiments can provide for a large sensor dynamic range, and/or provide for lower pressure sensitivity.

Figure 2A:
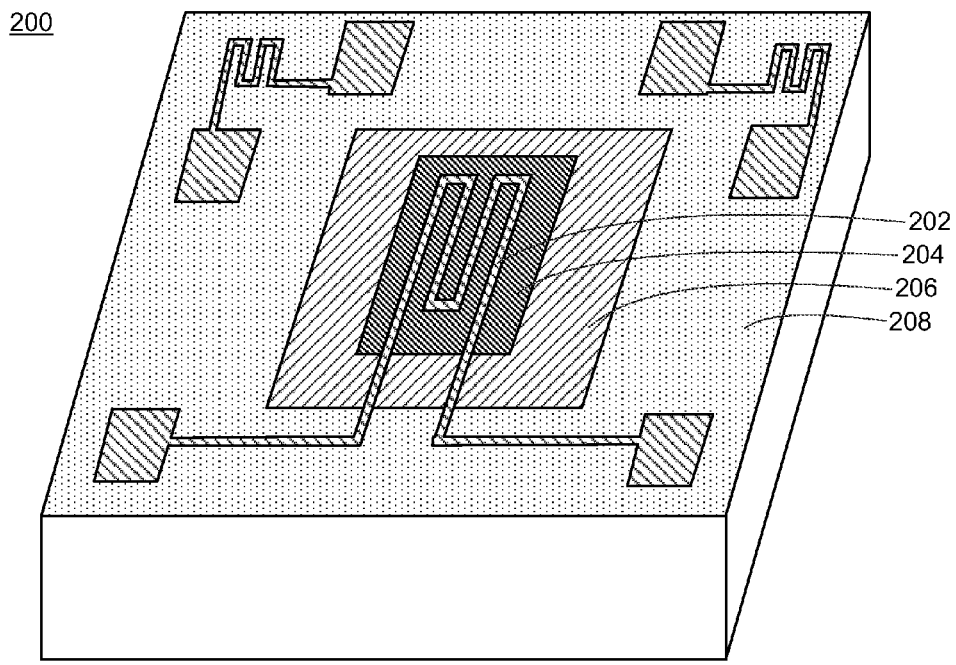
FIG. 2 includes views (A)-(B) illustrating an example of a micro-Pirani gauge in accordance with the present disclosure.
Figure 2B:
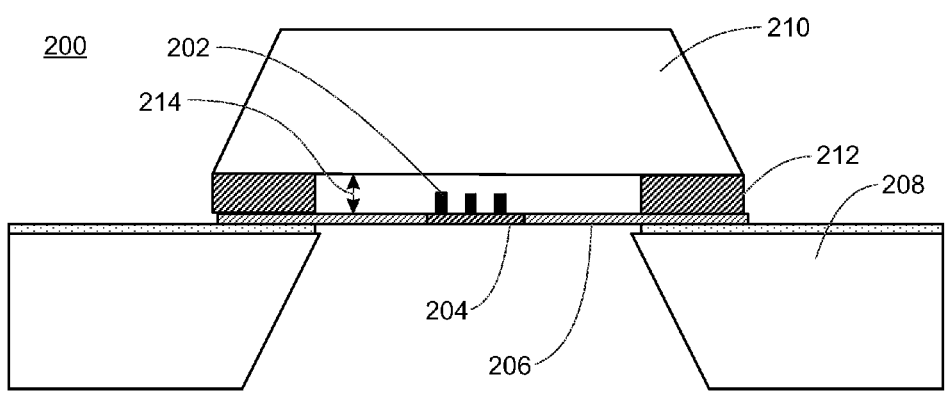

FIG. 2 includes views (A)-(B) illustrating an example of a micro-Pirani gauge (or, sensor) 200 in accordance with the present disclosure. An electric heating element, e.g., filament heater 202, is shown—near the center of the structure in view 2(A). This filament 202 can be embedded in or held by a thin platform 204 made of a thermally conductive material. The platform 204 may be located on a diaphragm or support element 206, which is connected to a substrate 208, and holds the platform 204 with heating element 202 relative to an open cavity (not shown) formed in the substrate 208. The support element 206 is preferably both electrically and thermally insulating. Heating element 202 may be made of a suitable material, examples of which include, but are not limited to nickel, titanium, platinum, silicon or polysilicon, or the like.

View 2(B) shows a side view of sensor 200, including the addition of a cap 210 of heat-sink material layer connected to substrate 208 by bonding material 212. A gap distance 214 presented by the cavity formed between the support element 206 and the cap 210 is also shown.

Exemplary embodiments of micro-Pirani gauges in accordance with the subject technology may include a hot wire filament that is covered by a highly thermally conductive, electrically insulated and mechanically robust material, such as aluminum nitride (AlN), e.g., formed as a platform. Aluminum nitride (AlN) is an exemplary material as it has a coefficient of thermal conductivity of 175 W/m·K$^{-1}$ compared with SiN 16 W/m·K$^{-1}$. The AlN may be used to encapsulate the heating filament. Both the heating filament and the platform can be supported by a surrounding support element (or, diaphragm) made of parylene, which has a very low coefficient of thermal conductivity (0.084 W/m·K^-1). The use of parylene (or, any low thermal conductivity material) can serve to suppress conductive heat transfer through the support layer. The use of AlN (or any high thermal conductivity material) as the filament encapsulant, e.g., in a platform, can enhance heat transfer through gaseous molecular exchange with the gas adjacent to the platform (in the cavity). In addition to high thermal conductivity, the encapsulant material is preferably mechanically and chemically robust so as to protect the filament from breakage or corrosion in a wide range of measurement environments, including those presented by highly-reactive gas species.

Figure 3:
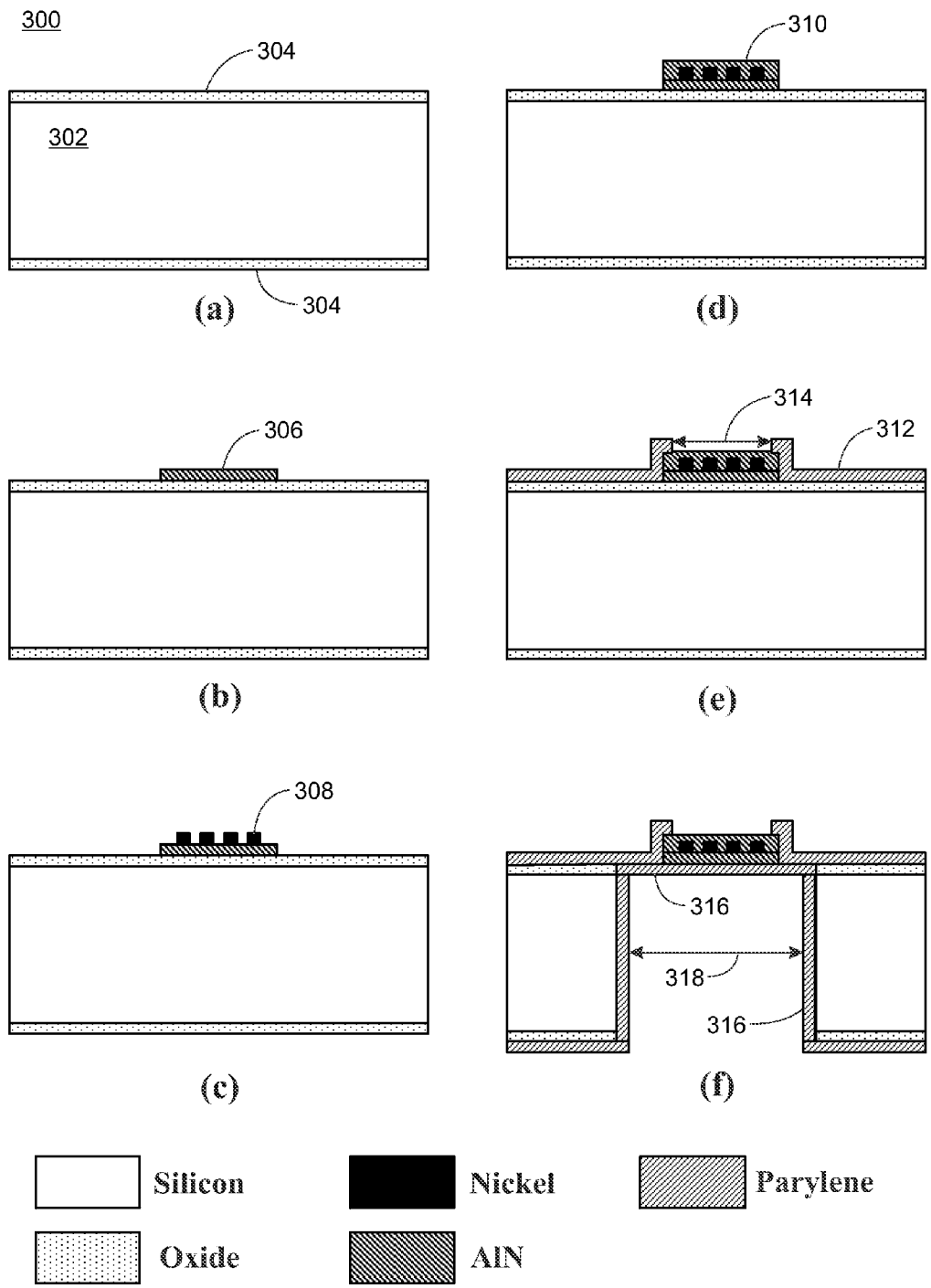
FIG. 3 depicts an example of a process of manufacturing a micro-Pirani gauge in accordance with the present disclosure.

FIG. 3 illustrates an exemplary method 300 of (or process for) manufacturing a micro-Pirani vacuum sensor, in accordance with the present disclosure. A substrate 302 having first and second passivation or insulating layers 304 is provided in step (a). A first layer of platform material 306 is deposited on a first side of the substrate 302 in step (b). Heating element material 308 is deposited on the first layer of platform material 306, in step (c). A second layer of platform material 310 is deposit on the heating element material 308 and the first layer of platform material 306 together in step (d), thereby forming a platform supporting the heating element material. A first layer of support element material 312 is deposited over at least a portion of the substrate and at least a portion of the platform, in step (e), wherein the support element material has a lower coefficient of thermal conductivity than that of the platform material. An aperture 314 may optionally be created or formed in the support element as shown. In embodiments not having an aperture 314, the support element material may cover the platform and such covering of support element material may have any desired practical depth/height. In step (f), substrate material adjacent to the platform is removed or etched from the backside of the substrate, e.g., by a suitable technique such as deep reactive ion etching (DRIE), wherein an aperture 318 is made in the substrate, exposing a portion of the platform and the first layer of support element material. As also shown for step (f), an optional second layer of support element material 316 may be deposited on the second side of the substrate and on the exposed portion of the platform and first layer of support element material. For method 300, any suitable fabrication techniques can be employed as one of ordinary skill in the art will appreciate. As was noted previously, in exemplary embodiments, aluminum nitride (AlN) can be utilized for the platform and/or parylene can be utilized for the support element. Other exemplary materials are also shown.

Figure 4A:
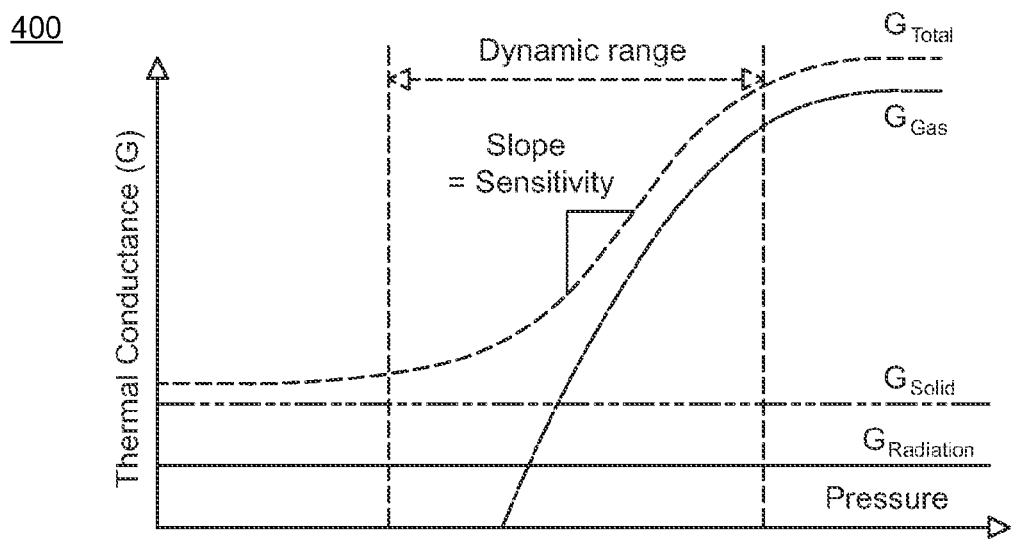
FIG. 4 includes graphs (A)-(C) illustrating theoretical and simulated performance characteristics of certain micro-Pirani gauges in accordance with the present disclosure.
Figure 4B:
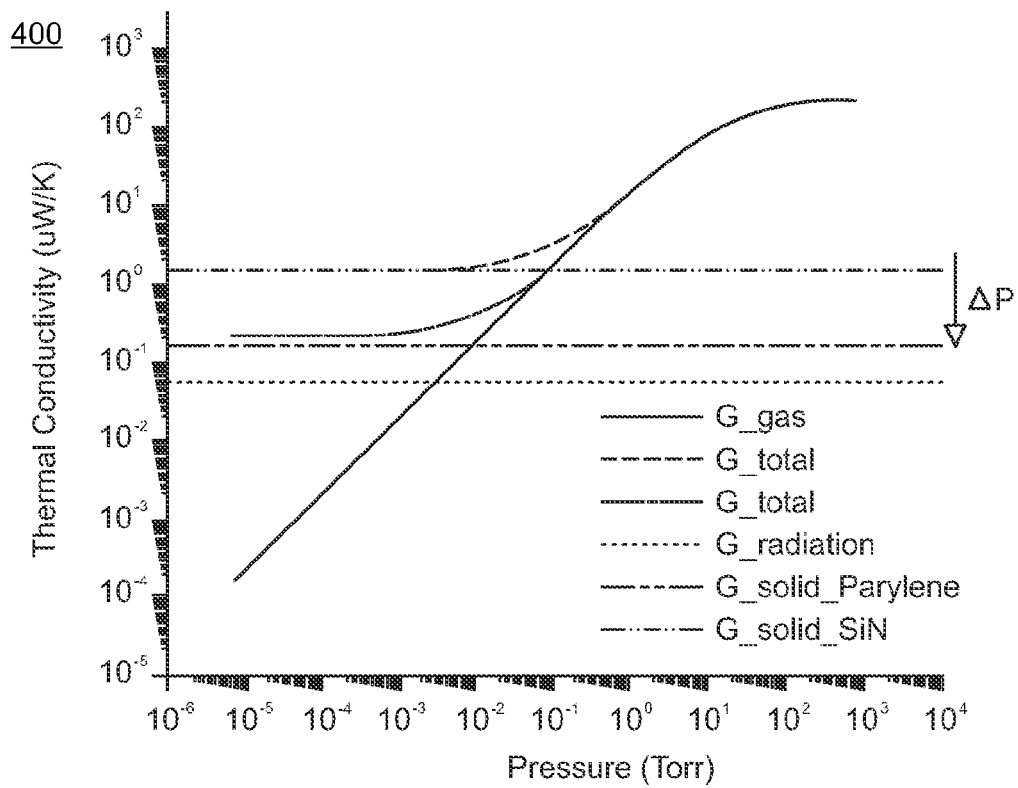
Figure 4C:
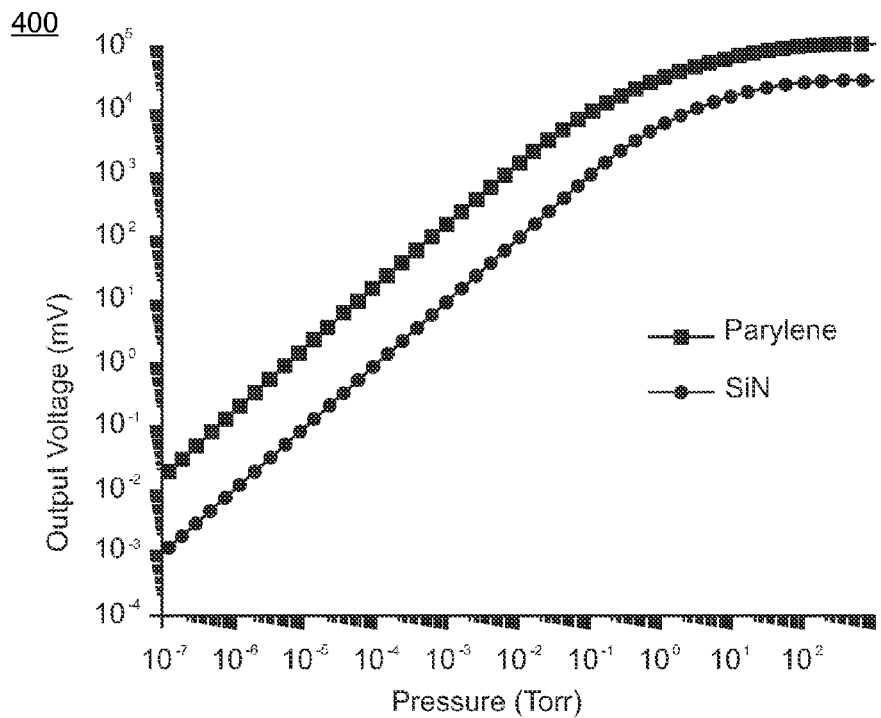

FIG. 4 includes graphs 400(A)-(C) illustrating theoretical and simulated performance characteristics of certain micro-Pirani gauges in accordance with the present disclosure. Graph 400(A) shows theoretical performance, in terms of thermal conductance plotted against pressure, of a micro-Pirani gauge in accordance with the present disclosure. The thermal conductance (or loss) due to radiation is depicted by the line "$G_{Radiation}$," while the thermal conductance of a gas and solid (structure of the gauge) are depicted by "$G_{Gas}$" and "$G_{Solid}$," respectively. The overall or combined thermal conductance for the micro-Pirani gauge is depicted by "$G_{Total}$." The dynamic range and slope sensitivity are also depicted. Graph 400(B) shows theoretical thermal conductivities of a micro-Pirani gauge in accordance with the present disclosure that utilizes a support element made of parylene, in comparison to a prior art micro-Pirani gauge that utilize a membrane made of silicon nitride (SiN). Graph 400(C) shows an operational simulation of an exemplary prospective embodiment utilizing a support element made of parylene and a platform made of aluminum nitride (AlN). The solid line labeled G_solid_SiN shows the lateral conductivity that would occur if the entire diaphragm were made of SiN. The solid line labeled G_solid_parylene shows the lateral conductivity that occurs when the diaphragm, or support element, is made of parylene and the heating filament is encapsulated within a platform made of AlN. It can be seen that the thermal transfer through the diaphragm is reduced by the use of parylene. As a result, the lowest detected pressure is lower by an amount delta-P (ΔP) compared to that of a Pirani gauge that uses a SiN diaphragm.

Figure 5:
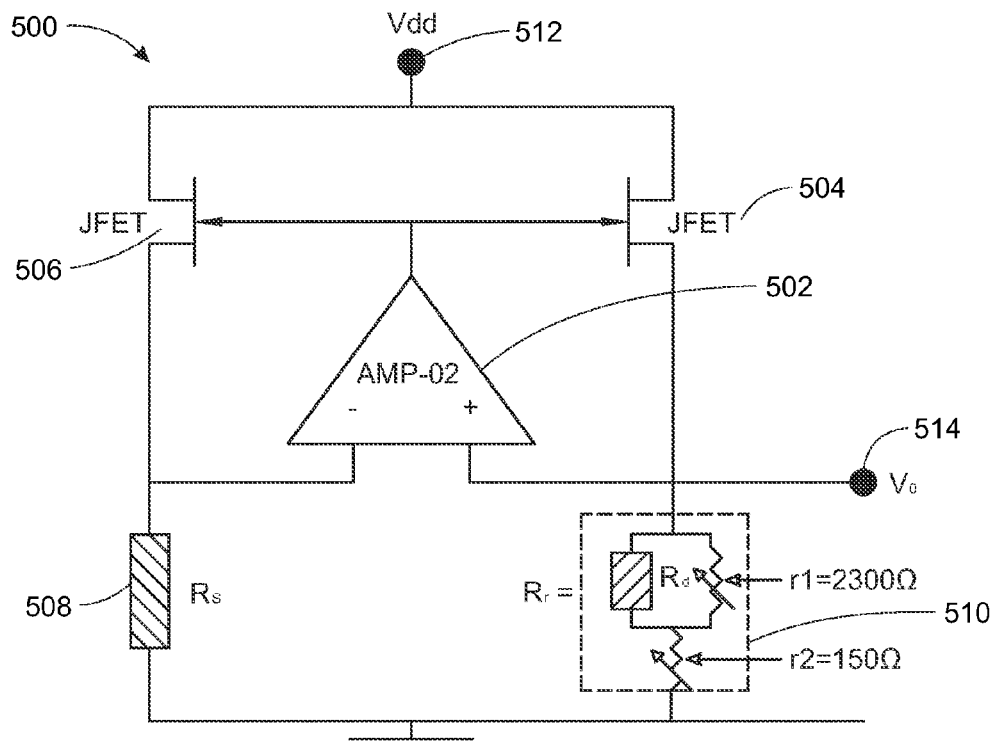
FIG. 5 depicts an example of a signal conditioning/driving circuit suitable for use with a micro-Pirani gauge in accordance with the present disclosure.

FIG. 5 depicts an example of signal conditioning/driving circuit 500 suitable for use with a micro-Pirani gauge in accordance with the present disclosure. Circuit 500 can include amplifier 502 with inputs and output as shown, configured in connection with two field effect transistors, e.g., junction field effect transistors (JFET's) 504 and 506. A source resistor 508 and a tunable resistive resistor (e.g., resistive network) 510 are also included in the circuit 500, along with Vdd 512, Vo 514, and ground 516 voltage terminals, which can receive voltage signals from a micro-Pirani sensor, e.g., 200 of FIG. 2.

As was noted previously, micro-Pirani gauges in accordance with the present disclosure, may be included within or be a part of other devices, e.g., multi-mode pressure gauges having one or more other pressure/vacuum sensors (e.g., other micro-Pirani sensors or other types of pressure sensors), or sensors that detect other physical phenomena (e.g., light, sound, electrical and/or magnetic characteristics, etc.). By including multiple micro-Pirani sensors, each possessing a different a gap distance, e.g., gap distance 214 of FIG. 2. Because the gap distance can define the effective mean path for gas molecules within the sensor, utilizing micro-Pirani sensors with different gap distances allows for measurement of different corresponding ranges of vacuum/pressure, which ranges may be selected/design as desired, e.g., overlapping, contiguous, separate, etc.

Figure 6A:
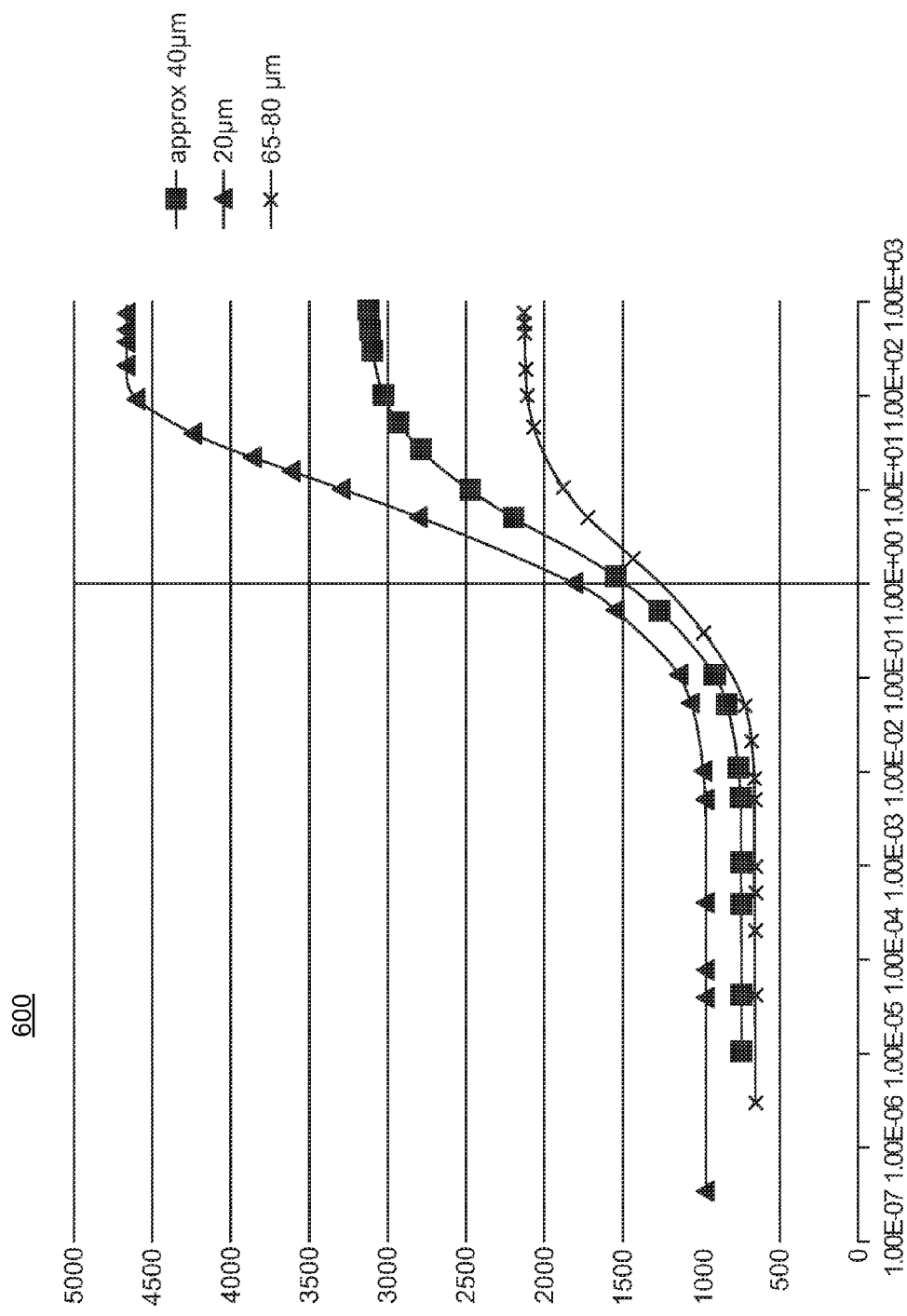
FIG. 6 includes graphs (A)-(B) illustrating theoretical and simulated performance characteristics of micro-Pirani sensors or gauges with different gap distances, in accordance with the present disclosure.
Figure 6B:
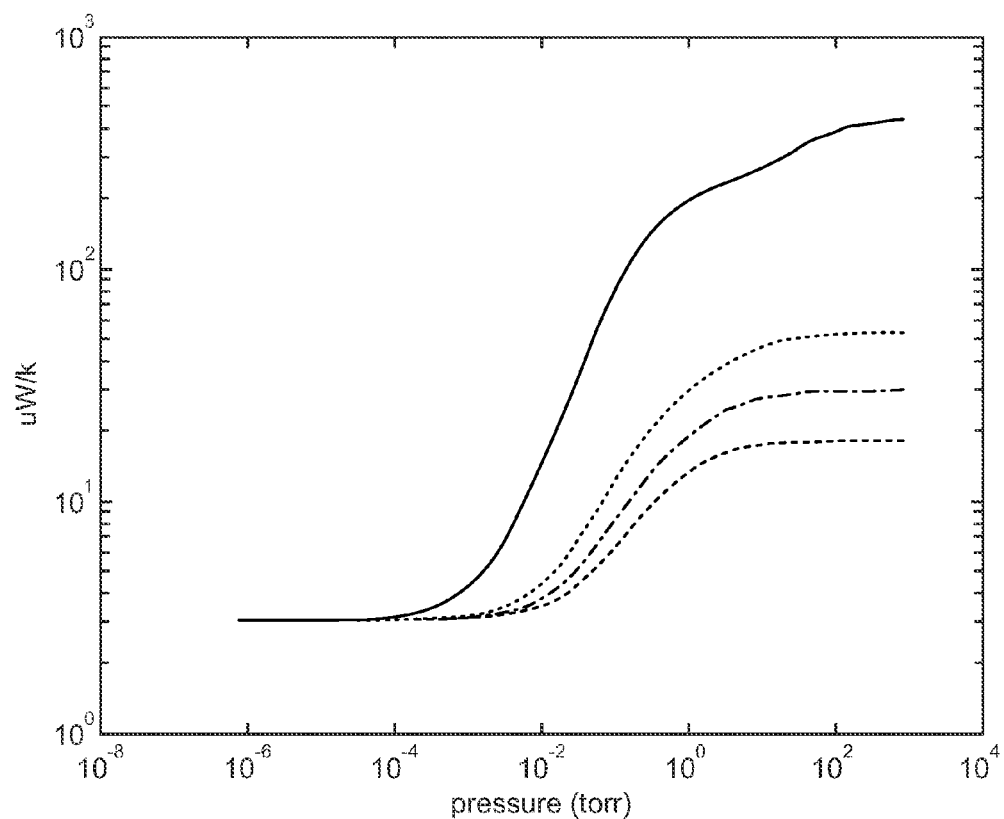

FIG. 6 includes graphs 600(A)-(B) illustrating experimental and simulated performance characteristics of micro-Pirani gauges with different gap distances in accordance with the present disclosure. In 600(A), measured thermal conductivity (ordinate) is shown plotted against pressure (abscissa) for three different micro-Pirani sensors, having gap distances as shown. Graph 600(B) shows four plots, each for a different gap distance, of thermal conductivity vs. pressure.

While the foregoing description is for exemplary embodiments, it should be noted that a support element of a micro-Pirani sensor according to the present disclosure need not be a continuous diaphragm/shape. Such a support element can be perforated or patterned, e.g., as by using O2 plasma by reactive ion etching (RIE). Such a configured could serve to further reduce lateral thermal conduction and thus increase the low-pressure sensitivity of the sensor.

Accordingly, micro-Pirani sensors according to the present disclosure can provide various advantages. For example, they may provide for measurement of pressures below the current limit of Pirani sensors (for example, to $10^{-6}$ Torr). Such micro-Pirani sensors according to the present disclosure may also provide for reduced power consumption and/or increased sensitivity.

Embodiments of micro-Pirani sensors according to the present disclosure that utilize parylene and AlN (for example) can provide corrosion resistance to fluorine and other reactive gas species typically encountered in semiconductor device processing/manufacturing, e.g., silane, compounds containing silicon, such as trichlorosilane and tetramethylsilane), silicon tetrachloride, and silicon tetrafluoride to name a few example. Accordingly, embodiments of micro-Pirani sensors according to the present disclosure may be particularly useful in semiconductor processes such as dry etching reaction systems.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

In reading the present disclosure, one skilled in the art will appreciate that embodiments of the present disclosure can be implemented in hardware, software, firmware, or any combinations of such, and over one or more networks. Suitable software can include computer-readable or machine-readable instructions for performing methods and techniques (and portions thereof) of designing and/or controlling the implementation of data acquisition and/or data manipulation. Any suitable software language (machine-dependent or machine-independent) may be utilized. Moreover, embodiments of the present disclosure can be included in or carried by various signals, e.g., as transmitted over a wireless RF or IR communications link or downloaded from the Internet.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A micro-Pirani vacuum sensor comprising:
   a heating element operative to heat a gas and to produce a signal corresponding to the pressure of the gas;
   a platform configured to receive the heating element, wherein the platform has a first coefficient of thermal conductivity; and
   a support element connected to a substrate and configured to support the platform with the heating element within an aperture disposed in the substrate, wherein the support element has a second coefficient of thermal conductivity, and wherein the second coefficient of thermal conductivity is less than the first coefficient of thermal conductivity.

2. The micro-Pirani sensor of claim 1, wherein the second coefficient of thermal conductivity is at least one order of magnitude less than the first coefficient of thermal conductivity.

3. The micro-Pirani sensor of claim 1, wherein the second coefficient of thermal conductivity is at least two orders of magnitude less than the first coefficient of thermal conductivity.

4. The micro-Pirani sensor of claim 1, wherein the second coefficient of thermal conductivity is less than or equal to 0.2 W/mK.

5. The micro-Pirani sensor of claim 1, wherein the support element comprises parylene, polyamide, polyimide, polytetrafluoroethylene (PTFE), silicon oxide, or silicon nitride.

6. The micro-Pirani sensor of claim 1, wherein the support element comprises a continuous diaphragm.

7. The micro-Pirani sensor of claim 1, wherein the support element is perforated or patterned.

8. The micro-Pirani sensor of claim 1, wherein the heating element comprises nickel, titanium, platinum, silicon or polysilicon.

9. The micro-Pirani sensor of claim 1, wherein the heating element comprises a material having a temperature coefficient of resistance greater than or equal to 0.003/° C.

10. The micro-Pirani sensor of claim 1, wherein the platform comprise aluminum nitride, silicon nitride, sapphire, diamond, or aluminum oxide.

11. The micro-Pirani sensor of claim 1, wherein the heating element is disposed within the platform and not directly exposed to the gas.

12. The micro-Pirani sensor of claim 1, wherein the platform is disposed within the support element and not directly exposed to the gas.

13. The micro-Pirani sensor of claim 1, further comprising a cap connected to the substrate and covering the support element, wherein the cap is configured to form a volume with a gap between a wall of the cap and the support element supporting the platform, wherein gap is a desired size, and wherein the gap provides a mean free path of a desired size for gas molecules within the volume.

14. The micro-Pirani sensor of claim 1, wherein the micro-Pirani vacuum sensor has a dynamic range of pressure measurement that includes 1×10E-6 Torr.

15. A dual-mode vacuum sensor comprising:
(A) a first vacuum sensor with a first dynamic range of pressure measurement, the first vacuum sensor comprising a micro-Pirani vacuum sensor having,
  (i) a heating element operative to heat a gas and to produce a signal corresponding to the pressure of the gas;
  (ii) a platform configured to receive the heating element, wherein the platform has a first coefficient of thermal conductivity; and
  (iii) a support element connected to a substrate and configured to support the platform with the heating element within an aperture disposed in the substrate, wherein the support element has a second coefficient of thermal conductivity, and wherein the second coefficient of thermal conductivity is less than the first coefficient of thermal conductivity; and
(B) a second vacuum sensor having a second dynamic range of pressure measurement.

16. The dual-mode vacuum sensor of claim 15, wherein the second coefficient of thermal conductivity is at least one order of magnitude less than the first coefficient of thermal conductivity.

17. The dual-mode vacuum sensor of claim 15, wherein the second coefficient of thermal conductivity are less than or equal to 0.2 W/mK.

18. The dual-mode vacuum sensor of claim 15, wherein the support element comprises parylene, polyamide, polyimide, or polytetrafluoroethylene (PTFE).

19. The dual-mode vacuum sensor of claim 15, wherein the support element comprises a continuous diaphragm.

20. The dual-mode vacuum sensor of claim 15, wherein the support element is perforated or patterned.

21. The dual-mode vacuum sensor of claim 15, wherein the heating element comprises nickel, titanium, platinum, silicon or polysilicon.

22. The dual-mode vacuum sensor of claim 15, wherein the heating element comprises a material having a temperature coefficient of resistance greater than or equal to 0.003/° C.

23. The dual-mode vacuum sensor of claim 15, wherein the platform comprise aluminum nitride, silicon nitride, sapphire, diamond, or aluminum oxide.

24. The dual-mode vacuum sensor of claim 15, wherein the heating element is disposed within the platform and not directly exposed to the gas.

25. The dual-mode vacuum sensor of claim 15, wherein the platform is disposed within the support element and not directly exposed to the gas.

26. The dual-mode vacuum sensor of claim 15, further comprising a cap connected to the substrate and covering the support element, wherein the cap is configured to form a volume with a gap between a wall of the cap and the support element supporting the platform, wherein gap is a desired size, and wherein the gap provides a mean free path of a desired size for gas molecules within the volume.

27. The dual-mode vacuum sensor of claim 15, wherein the micro-Pirani vacuum sensor has a dynamic range of pressure measurement that includes 1×10E-6 Torr.

28. The dual-mode vacuum sensor of claim 15, wherein the second sensor comprises a micro-Pirani vacuum sensor.

29. The dual-mode vacuum sensor of claim 15, wherein the second sensor comprises a capacitance manometer.

30. The dual-mode vacuum sensor of claim 15, wherein the second sensor comprises a piezoresistive manometer.

31. The dual-mode vacuum sensor of claim 15, wherein the second sensor comprises a resonator pressure sensor.

32. A method of manufacturing a micro-Pirani vacuum sensor, the method comprising:
  depositing a first layer of platform material on a first side of a substrate;
  depositing heating element material on the first layer of platform material;
  depositing a second layer of platform material on the heating element material and the first layer of platform material together;
  forming a platform supporting the heating element material;
  depositing a first layer of support element material over at least a portion of the substrate and at least a portion of the platform, wherein the support element material has a lower coefficient of thermal conductivity than that of the platform material; and
  removing substrate material adjacent to the platform, wherein an aperture is made in the substrate, and exposing a portion of the platform and the first layer of support element material.

33. The method of claim 32, further comprising depositing a second layer of material on the second side of the substrate and on the exposed portion of the platform and first layer of support element material.

34. The method of claim 32, further comprising providing a substrate having a passivation layer on first and second sides.

35. The method of claim 34, wherein the passivation layer comprises silicon oxide or silicon nitride.

36. The method of claim 32, wherein depositing a first layer of support element material comprises depositing the material over an entire extent of a surface of the platform.

37. The method of claim 32, wherein the support element material comprises parylene, polyamide, polyimide, or polytetrafluoroethylene (PTFE).

38. The method of claim 32, wherein removing substrate material adjacent to the platform comprises backside etching.

39. The method of claim 32, wherein depositing a first layer of support element material comprises patterning an exposed area of the platform.

* * * * *